United States Patent [19]

Hirata

[11] 4,369,471
[45] Jan. 18, 1983

[54] APPARATUS FOR AND METHOD OF PROCESSING THE IMAGE SIGNAL

[75] Inventor: Toshitaka Hirata, Tokyo, Japan

[73] Assignee: Rocoh Company, Ltd., Tokyo, Japan

[21] Appl. No.: 239,500

[22] Filed: Mar. 2, 1981

[30] Foreign Application Priority Data

Mar. 5, 1980 [JP] Japan .................................. 55-27717

[51] Int. Cl.³ .............................................. H04N 1/40
[52] U.S. Cl. .................................... 358/280; 358/282; 358/160
[58] Field of Search ................... 358/50, 41, 42, 21 R, 358/37, 160, 166, 280, 282, 284

[56] References Cited

U.S. PATENT DOCUMENTS 3,911,212 10/1975 Yoshizawa .......................... 358/280
4,276,568 6/1981 Wischer .............................. 358/280

Primary Examiner—Tommy P. Chin
Attorney, Agent, or Firm—Guy W. Shoup; Elliot S. Gerber; Gerard F. Dunne

[57] ABSTRACT

An image signal processing method in which an image light is projected on photoelectric conversion means and an image signal produced by said photoelectric conversion means is changed into an image signal in a binary form. The amplitude and level of an information signal to be binarily processed are kept nearly constant according to the invention and consequently the binary processing can be performed with a least leakage of informations.

8 Claims, 5 Drawing Figures

APPARATUS FOR AND METHOD OF PROCESSING THE IMAGE SIGNAL

BACKGROUND OF THE INVENTION

The present invention relates to a method of reading out color image informations on an original script acquired in the form of a binary electric signal, and especially relates to a method of processing an image signal by reading out the image informations by means of a photoelectrical converter means, acquiring an analogue image signal and processing it binarily in order to obtain a binary color image signal.

As to reading out the image informations, in general, an image is focussed on the photo-sensing surface of a solid state image picking-up element by an optical system. However, there occur some problems that the high and low density distribution of the image or the space frequency causes the level of image signal read out to fluctuate and in consequence binary image processing at a high resolution turns out very difficult.

SUMMARY OF THE INVENTION

In view of the above, a primary object of the present invention is to provide a method of binarily processing the image signal with a least leakage of information over the entire range of the image density.

Another object of the present invention is to simplify the construction of image signal processing apparatus and, therefore, decrease the number of its circuit elements.

In order to accomplish the afore-mentioned objects, a standard signal showing the mean value or the smoothed value of the photoelectrically converted image signal is obtained by means of a filter circuit according to the present invention. On the basis of the standard signal thus obtained, an inverted phase signal that is low when the level of the standard signal is high and vice versa is obtained by means of an operational amplifier means. And then, a binary image signal is obtained by comparing a product signal which is produced by multiplying the photoelectrically converted image signal by the inverted phase signal with the standard signal. As illustrated before, the entire level of the photoelectrically converted image signal is low when the density of image is high and vice versa. The inverted phase signal of the output of the filter circuit showing the mean value, that is, the inverted phase signal of the standard signal varies inversely to the standard signal. Consequently, the product signal showing the product of the inverted phase signal and the photoelectrically converted image signal has a small difference between the product signal value at the high image density and that at the low image density. Namely, the fluctuation of the product signal is small when the density of image varies largely. For this reason, the binarily processed image signal can be obtained with a least leakage of information over the entire range of high and low densities by comparing the product signal with the standard signal.

DETAILED DESCRIPTION OF THE DRAWINGS

Figure 1:
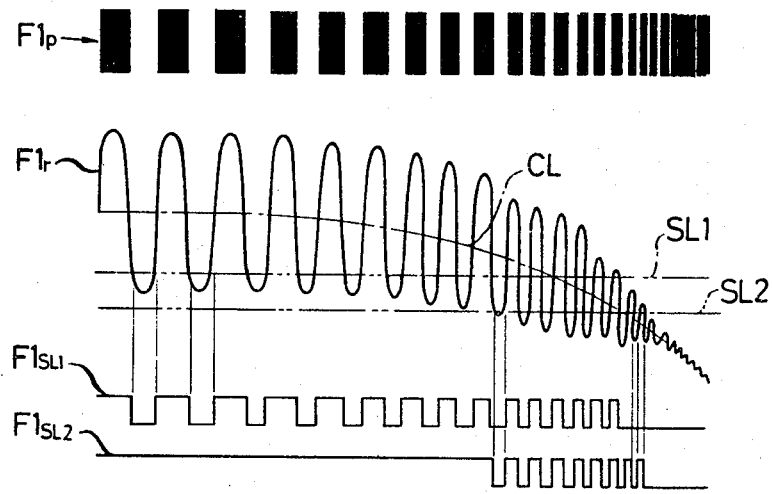
FIG. 1 is a view of wave forms of the read out image signal and the binarily processed image signal in respect to the image signal processing of the prior art.

Referring to FIG. 1, when the original script having an image distribution as shown in $F1_p$ is read out by means of a linear image sensor, for instance, CCD (Charge Coupled Device), the output $F1_r$ read out by the image sensor shows variation of the level in response to the image's density distribution. The mean level CL of the image sensor output decreases when the density of image increases. Thereupon, the binarily-processed image signal $F1_{sL1}$ is obtained by binary processing the image signal at a constant standard level SL1. This image signal $F1_{sL1}$ becomes entirely-white or entirely-black at the portion of high density image distribution, as the over-all level of $F1_r$ is lower than SL1 there. Consequently, the image informations at the portion of high density disappear. When the standard level is set to the low value SL2, the extent of the image information's disappearance decreases at the high density image portion, while the image informations at the low density image portion disappear. As mentioned above, it is difficult to process the image binarily with at least leakage over the entire range of both low and high density images. It may be possible to reduce leakage by rendering the standard level equal to the mean value CL instead of a constant value. However, there exists no filter circuit that picks up trustworthily the mean value over the wide range from the high density image distribution to the low density image distribution and, as the output of the filter circuit shifts from the mean value except within the specific density range established for the filter circuit, the image informations also disappear. Further, there is a method of establishing the standard level to the maximum or minimum value of $F1_r$, heretofore. However, the binarily-processed image signal lacks the informations as shown in $F1_{sL1}$ and $F1_{sL2}$ of FIG. 1 as the standard level is constant until re-establishment after establishing the standard level.

Figure 2:
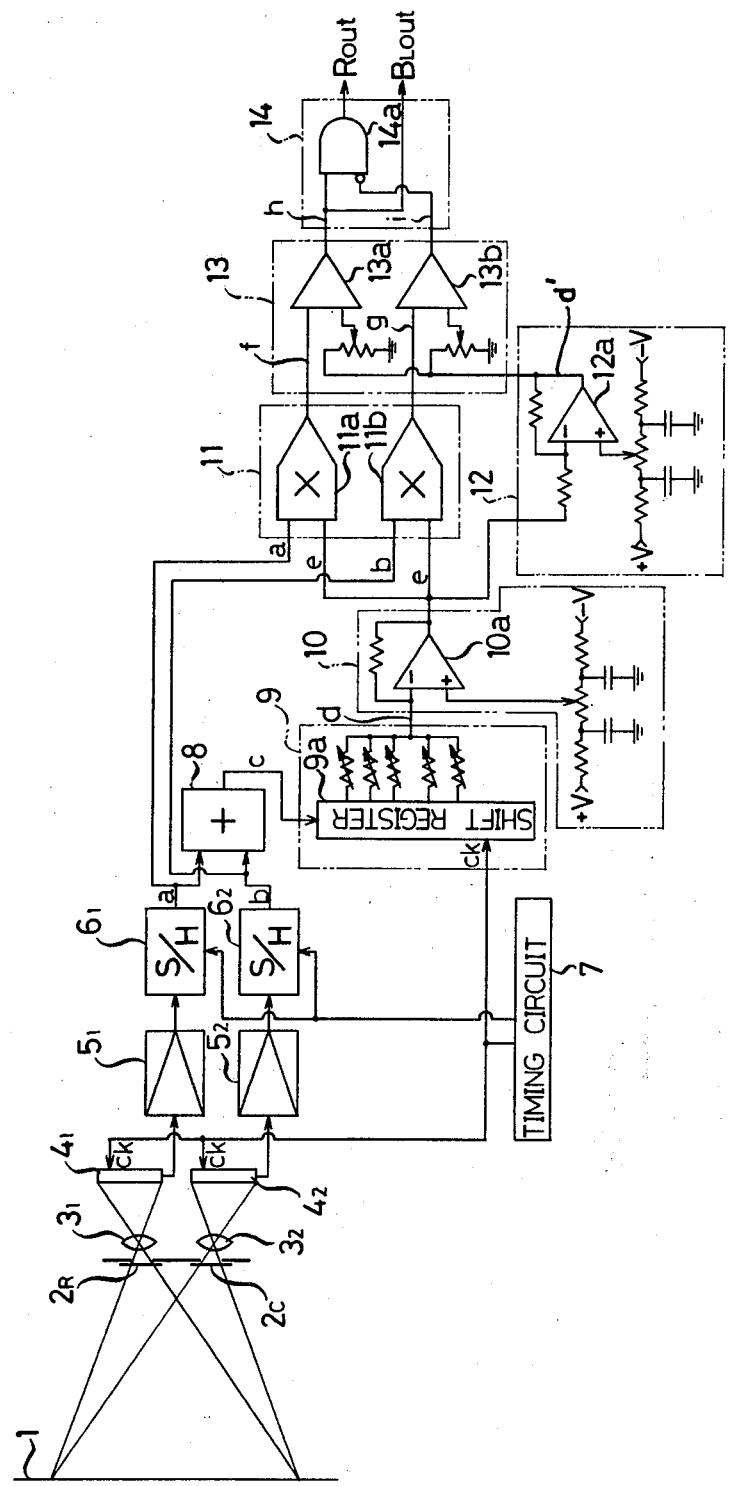
FIG. 2 is a circuit diagram of the apparatus for accomplishing the present invention.

FIG. 2 shows a circuit construction for accomplishing the present invention. In the figure, 1 is an original script. One line of the image to be read out is projected on the first linear image sensor $4_1$ (for instance CCD) through a red filter $2_R$ and an image focussing lens $3_1$. It is also projected on the second linear image sensor $4_2$ (for example CCD) through a cyanic filter $2c$ and a lens $3_2$. The image sensors $4_1$ and $4_2$ output respectively an analogue image signal to the amplifiers $5_1$ and $5_2$ by self-scanning. The level of the analogue signal is adjusted in the amplifiers $5_1$ and $5_2$. The respective analogue output signals of the amplifiers $5_1$ and $5_2$ are input to sample holding circuits $6_1$ and $6_2$ in which the analogue output signal is held constant until the following analogue output signal will be input. And then, analogue signals a and b that are thus kept constant are input to an adder 8 constructed with an operational amplifier and the output c (addition signal) of the adder 8 is applied to a filter circuit 9.

Figure 4:
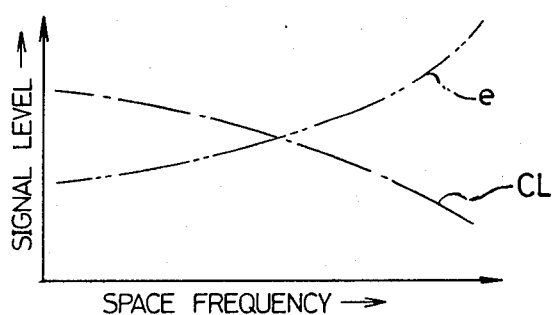
FIG. 4 is a graph showing the relation of the mean level of the image signal and the level of its inverted phase signal for the image's space frequency.

The filter circuit 9 comprises a serial-input and parallel-output type analogue shift register 9a and resistors connected to the parallel output of the shift register 9a. The respective outputs of the analogue shift register 9a are weighted by the resistors and applied to the subtraction side input of a subtractor 10. The subtractor 10 comprises an operational amplifier 10a and a basic bias circuit. The operational amplifier 10a outputs an inverted phase signal e, the phase of which is inverse to that of the mean value CL as shown in FIG. 4. The inverted phase signal e is applied to a multiplier 11 and an inverted phase amplifier 12.

The multiplier 11 comprises two multiplier elements 11a and 11b to which the inverted phase signal e and the analogue signals a and b are applied. The respective multiplier elements 11a and 11b output a product signal f showing the product of the inverted phase signal e and the analogue signal a and another product signal g showing the product of the inverted phase signal e and the analogue signal b to respective comparators 13a and 13b in a comparator 13.

The output signal d' of the phase inverting amplifier 12 or the standard signal d' proportional to the output signal d of the filter circuit 9, the phase of which is inverse to that of the inverted phase signal e, is applied as a reference signal to the comparator elements 13a and 13b which output binarily processed color information signals h and i, respectively. The binary image signals h and i are converted to color-discriminating binary image signals $R_{out}$ and $BL_{out}$ by means of a color decoder 14. A timing circuit 7 applies image element synchronizing pulses to the linear image sensors $4_1$ and $4_2$, the sample holding circuits $6_1$ and $6_2$ and the analogue shift register 9a.

Figure 3:
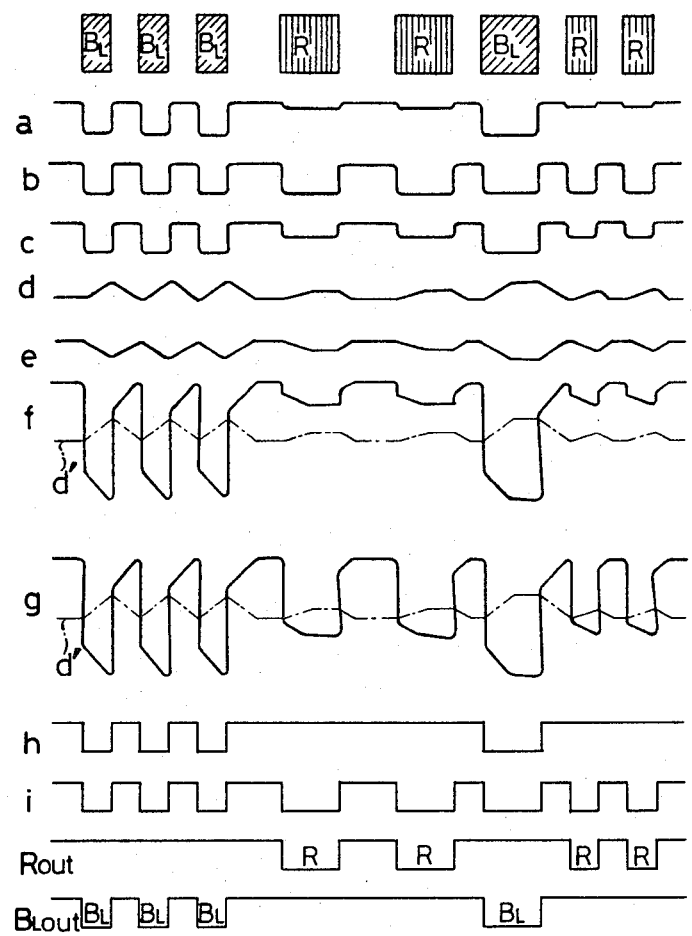
FIG. 3 is a view of wave forms of the respective signals in the circuits of the circuit diagram shown in FIG. 2.

The signals a~i, $R_{out}$ and $BL_{out}$ at the respective points of the circuits shown in FIG. 2 are shown in FIG. 3 in relation to the image. In this embodiment, standard signals d and d' are produced by applying the addition signal c that is obtained by adding the photoelectrically converted image signals or analogue signals a and b by means of the adder 8, to the filter circuit 9, for the purpose of reducing the number of the circuit elements in spite of performing a read-out in two colors by composing the filter circuit 9, the subtractor 10 and the phase inverting amplifier 12 as a single set.

In FIG. 3, a is an analogue signal obtained by reading out the color informations as shown in the top of FIG. 3 through the red filter $2_R$, while b is an analogue signal obtained by reading out the color informations through the cyanic filter 2c. As to the signal a, red informations R have approximately a same level as white informations, while the red informations R have approximately a same level as black color informations BL as to the signal b. The signal c is obtained by adding the signals a and b together by means of the adder 8. However, the voltage level of the signal c shown in FIG. 3 is not of the same dimension as that of the signals a and b.

The signal d is produced by adding the respective outputs of the shift register 9a together through the weighted resistors. Actually, the signal d can not be observed by an oscilloscope at the output of the filter circuit 9 and, therefore, is imaginarily shown in FIG. 3. The signal e, the phase of which is inverse to that of the afore-mentioned addition signal d, is applied to the multiplier 11. The magnitude of the signal e is large when the read-out signal's level is low at the high image density area and vice versa. As a result, the output of the multiplier 11 becomes always nearly constant in the amplitude regardless to the level of the read-out signal.

The signals f and g are the product signals (red information signal and cyanic information signal) produced by multiplying the signals through the red filter $2_R$ and the cyanic filter 2c respectively by the signal e in the multiplier 11. The product signals are binarily processed by comparing them in the comparator 13 with the standard signal d', the phase of which is inverse to that of the multiplying signal e. In consequence, the binarily processed color information signals h and i may be obtained with a least leakage of informations.

On the basis of these red and cyanic binarily processed color information signals, these signals h and i are converted to the red signal $R_{out}$ and the black signal $BL_{out}$ by means of the color decoder 14, respectively.

Figure 5:
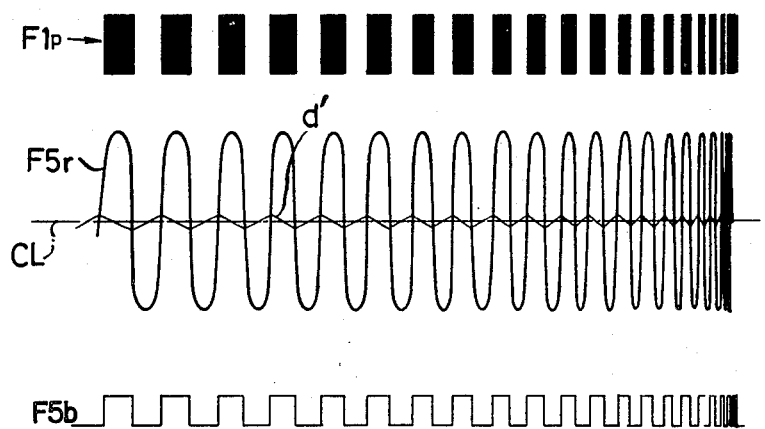
FIG. 5 is a view similar to FIG. 1, but shows wave forms of the read out image signal and the binarily processed image signal obtained by the method according to the invention.

As the mean value CL of the analogue signals a and b varies, as shown in FIG. 4, for the density of image or the space frequency shown in FIG. 1 and the inverted phase signal e varies inversely to the mean value CL above-mentioned, the level fluctuation of the product signals f and g is small in respect to the variation of the space frequency. For example, as to the image distribution $F1_p$ shown in FIG. 1, the amplitude and level of the signal f or g which is an output of the multiplier 11 are kept nearly constant, as shown at F5r in FIG. 5, and the standard signal d' is situated approximately in the center line CL of the amplitude. Consequently, the binary processing can be easily and reliably performed and the binarily processed image signal thus obtained is shown at F5b in FIG. 5.

As is apparent from the afore-mentioned illustrations, according to the present invention, the fluctuation of the image signal level (f, g) for binarily processing the image signal in relation to the image density is lowered and the image signal level is heightened especially at the high image density portion. Therefore, the binarily processing possibility increases and the leakage of information decreases.

Various other embodiments will become possible for those skilled in the art after receiving the teachings of the present disclosure without departing from the scope thereof.

What is claimed is:

1. Method of processing an image signal for projecting an image light on photoelectric conversion means and changing a photoelectrically converted image signal into an image signal in a binary form, characterized in that a standard signal showing the mean value or smoothed value of the photoelectrically converted image signal is obtained by means of a filter circuit, on the basis of the standard signal thus obtained an inverted phase signal that is low when the level of the standard signal is high and vice versa is obtained by means of an operational amplifier means, and a product signal which is produced by multiplying the photoelectrically converted image signal by the inverted phase signal is compared with the standard signal so as to acquire said binary image signal.

2. Method of processing an image signal as defined in claim 1, characterized in that said filter circuit is a serial-input and parallel-output type analogue shift register, to which a photoelectrically converted image signal is applied, and the respective parallel outputs of said shift register are added together so as to acquire the standard signal.

3. Method of processing an image signal as defined in claim 1 or 2, characterized in that a photoelectrically converted image signal read out through a red filter and that read out through a cyanic filter are added together by means of the operational amplifier means, the addition signal thus produced is applied to said filter circuit so as to produce the standard signal, and a first product signal which is produced by multiplying the photoelectrically converted image signal read out through a red filter by the inverted phase signal and a second product signal which is produced by multiplying the photoelectrically converted image signal read out through a cyanic filter by the inverted phase signal are compared with the standard signal respectively so as to acquire a couple of binary image signals.

4. Apparatus for the processing of an image signal including:
   means for projecting an image light on original script;
   means for the photoelectric conversion of the script into electrical image signals representing the script;
   means for changing said image signals into image signals in analogue form;
   a filter circuit means for obtaining a standard signal providing the mean value or smoothed value of the analogue image signal;
   means to provide an inverted phase signal on the basis of the said standard signal, the inverted phase signal being low when the level of the standard signal is high and vice versa;
   means to produce a product signal by multiplying said analogue image signal by the said inverted phase signal; and
   means to compare said product signal with the said standard signal to obtain a binary image signal.

5. Apparatus for the processing of an image signal as defined in claim 4, characterized in that said filter circuit is a serial-input and parallel-output type analog shift register to which said analogue image signal is applied, the said apparatus further including means to add together the respective parallel outputs of said shift register to obtain said standard signal.

6. Apparatus for the processing of an image signal as defined in claims 4 and 5, wherein said conversion means further including a red filter and a cyanic filter to read out a pair of signals which are converted to a pair of said analogue image signals, the binary signals derived from said red and cyanic filters being added together by means of operational amplifier means, the addition signal thus produced being applied to said filter circuit to produce said standard signal, and wherein a first product signal is produced by multiplying the analogue image signal derived from said red filter by the inverted phase signal and a second product signal is produced by multiplying the analogue image signal derived from said cyanic filter by the inverted phase signal, and wherein said two product signals are compared with the standard signal to obtain a couple of binary image signals.

7. Apparatus for the processing of an image signal as in claims 4 or 5 wherein said means to provide an inverted phase signal includes an operational amplifier whose input is connected to said filter circuit.

8. Apparatus for the processing of an image signal including:
   means for projecting an image light on original script;
   a first and a second means for the photoelectric conversion of the script into a pair of electrical image signals representing two different chromatic ranges of the script;
   means for changing said pair of electrical image signals into a pair of image signals in analogue form;
   a filter circuit means including a serial-input and parallel-output type analog shift register for obtaining a standard signal providing the mean value or smoothed value of the pairs of analogue image signals;
   operational amplifier means connected to said filter circuit means to provide an inverted phase signal on the basis of said standard signal, the inverted phase signal being low when the level of the standard signal is high and vice versa;
   first and second product signal means each to produce a product signal by multiplying a respective one of the said analogue image signals by the said inverted phase signal; and
   means to compare said pair of product signals with said standard signal to obtain a binary image signal.

* * * * *